(12) United States Patent
Du et al.

(10) Patent No.: US 10,182,331 B2
(45) Date of Patent: Jan. 15, 2019

(54) TERMINAL DEVICE AND EARLY WARNING METHOD THEREOF

(71) Applicant: ZTE CORPORATION, Shenzhen, Guangdong Province (CN)

(72) Inventors: Ting Du, Shenzhen (CN); Hui Xu, Shenzhen (CN); Zijiang Ma, Shenzhen (CN); Yaying Wang, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 0 days.

(21) Appl. No.: 15/529,090

(22) PCT Filed: May 20, 2015

(86) PCT No.: PCT/CN2015/079402
§ 371 (c)(1),
(2) Date: May 24, 2017

(87) PCT Pub. No.: WO2016/082493
PCT Pub. Date: Jun. 2, 2016

(65) Prior Publication Data
US 2017/0265050 A1 Sep. 14, 2017

(30) Foreign Application Priority Data

Nov. 28, 2014 (CN) .......................... 2014 1 0710247

(51) Int. Cl.
*H04W 4/021* (2018.01)
*H04W 4/90* (2018.01)
(Continued)

(52) U.S. Cl.
CPC ............ *H04W 4/90* (2018.02); *H04W 4/021* (2013.01); *H04W 64/003* (2013.01);
(Continued)

(58) Field of Classification Search
CPC ..... H04W 4/22; H04W 76/046; H04W 4/021; H04W 76/04; H04W 4/02; H04W 8/16;
(Continued)

(56) References Cited

U.S. PATENT DOCUMENTS 6,169,476 B1 * 1/2001 Flanagan ............... G08B 21/10
340/286.02
8,013,734 B2 * 9/2011 Saigh ................ H04M 1/72541
340/539.13
(Continued)

FOREIGN PATENT DOCUMENTS

CN 103997713 A 8/2004
CN 102546947 A 7/2012
(Continued)

*Primary Examiner* — Meless Zewdu
(74) *Attorney, Agent, or Firm* — Ling Wu; Stephen Yang; Ling and Yang Intellectual Property

(57) ABSTRACT

The embodiments of the present disclosure disclose a terminal device and an early warning method for the terminal device. The method includes: a terminal starts a global positioning system (GPS) positioning to acquire current geographical location information in real time, and matches the current geographical location information with geographical location information of a set region in a service area of a base station to which the terminal belongs; if a matching result is that the terminal has left the set region of the base station to which the terminal belongs, the terminal performs an early warning operation. The terminal device includes a matching unit and an early warning processing unit.

8 Claims, 4 Drawing Sheets

(51) Int. Cl.
*H04W 76/27* (2018.01)
*H04W 64/00* (2009.01)
*H04W 76/50* (2018.01)
*G01S 5/02* (2010.01)
*H04W 4/20* (2018.01)

(52) U.S. Cl.
CPC ........... *H04W 76/27* (2018.02); *G01S 5/0252* (2013.01); *H04M 2250/10* (2013.01); *H04W 4/20* (2013.01); *H04W 76/50* (2018.02)

(58) Field of Classification Search
CPC ............... H04W 8/18; H04W 52/0251; H04W 52/0254; H04W 52/0261; H04W 4/203; H04W 4/008; H04W 76/045; H04W 4/90; H04W 4/022; H04W 4/20; H04W 4/50; H04W 76/50; H04W 76/27; H04W 64/003; H04W 76/00; H04M 2250/10; G01S 5/0252
See application file for complete search history.

(56) References Cited

U.S. PATENT DOCUMENTS

| | | | | |
|---|---|---|---|---|
| 2007/0052518 A1* | 3/2007 | Nakamura | ............. | G08B 25/00 340/5.3 |
| 2007/0243869 A1* | 10/2007 | Kwon | ................ | G08B 21/0261 455/435.1 |
| 2009/0247147 A1 | 10/2009 | Hadinata et al. | | |
| 2010/0009698 A1* | 1/2010 | Yang | ................. | G06F 17/30241 455/456.3 |
| 2011/0009090 A1* | 1/2011 | Sparks, III | ........ | H04M 1/72572 455/410 |
| 2012/0235860 A1* | 9/2012 | Ghazarian | ............... | G01S 19/16 342/357.4 |
| 2013/0095837 A1* | 4/2013 | Zhou | ..................... | H04W 64/00 455/440 |
| 2014/0062695 A1* | 3/2014 | Rosen | .................... | G08B 21/18 340/539.13 |
| 2014/0066097 A1* | 3/2014 | Kolodziej | ............. | H04W 4/023 455/456.3 |
| 2014/0302879 A1* | 10/2014 | Kim | .................. | H04W 52/0225 455/457 |
| 2014/0315577 A1* | 10/2014 | Yokoyama | ........... | H04W 24/04 455/456.1 |
| 2014/0327547 A1* | 11/2014 | Johnson | .............. | H04L 12/1895 340/601 |
| 2015/0105105 A1* | 4/2015 | Van Heerden | ...... | H04W 64/006 455/456.3 |
| 2015/0161867 A1* | 6/2015 | Bell | ....................... | G08B 21/02 340/539.13 |
| 2015/0296333 A1* | 10/2015 | Chen | ...................... | H04W 4/02 455/456.1 |
| 2017/0332218 A1* | 11/2017 | Du | .......................... | H04W 4/16 |

FOREIGN PATENT DOCUMENTS

| | | |
|---|---|---|
| EP | 2897389 A2 | 7/2015 |
| KR | 10-2005-0089363 A | 9/2005 |
| WO | 2013185728 A2 | 12/2013 |

* cited by examiner

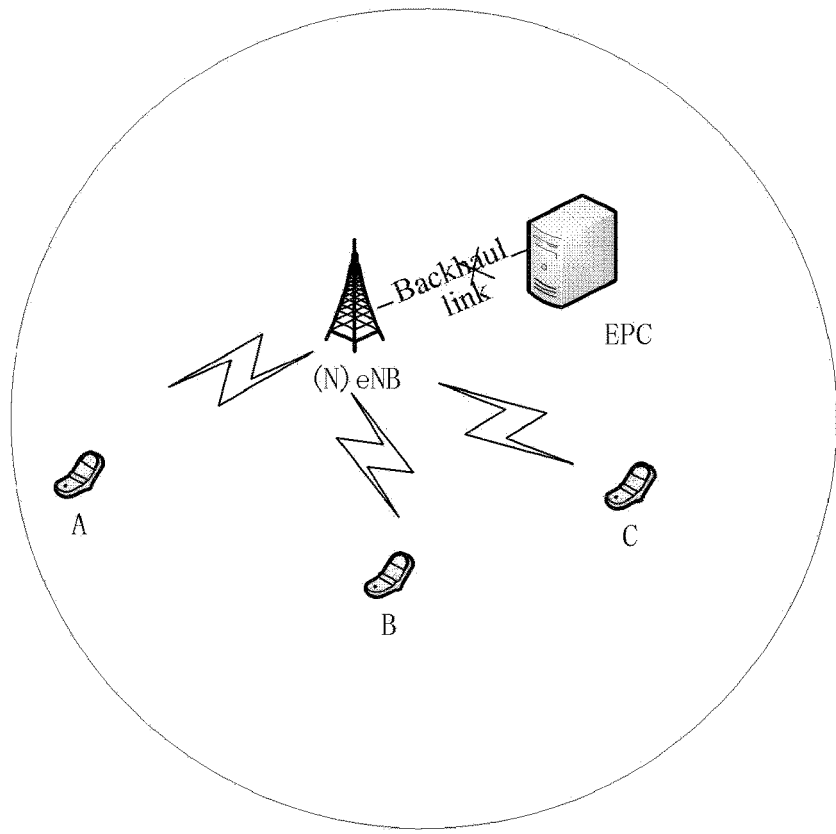

FIG. 1

| A terminal starts GPS positioning to acquire current geographical location information in real time, and matches the current geographical location information with geographical location information of a set region in a service area of a base station to which the terminal belongs | Step 1 |

| If a matching result is that the terminal has left the set region in the service area of the base station to which the terminal belongs, the terminal performs an early warning operation | Step 2 |

FIG. 2

TERMINAL DEVICE AND EARLY WARNING METHOD THEREOF

TECHNICAL FIELD

The present disclosure relates to the field of cluster technology, in particular to a terminal device and an early warning method for the terminal device.

BACKGROUND

At present, the cluster communication system is developed to meet the requirements of industry users, such as command and dispatch and so on, and the cluster communication system is the private wireless communication system oriented specific industry applications. The main characteristics of the cluster communication system which is different from the public radio mobile communication system is that, in addition to provide the two-direction call function of the mobile phone, the cluster communication system can provide the cluster (group) call and the whole call within the system, and even establish the call priority level, and it can also perform communication functions which the normal mobile phones do not have in the system, such as priority level call, emergency call and other communication; it can also provide special functions, such as dynamic reassembly, the virtual special network within the system and so on. These features are particularly suitable for dedicated communications for police, national safety departments and command and dispatch requirements for airport, customs, public transport, disaster relief and so on, so the cluster communication system was widely applied in government departments, public safety, emergency communications, electricity, civil aviation, petrochemical, military and enterprises and other fields, and it is a multi-purpose, high-performance wireless communication system, and it formed a dedicated communication network which is independent of the public mobile communication network all over the world.

With the growing shortage of spectrum resources, the voice for the public network cluster is more and more high. Public network cluster refers to developing specific cluster communication services based on the existing public mobile communication network.

To ensure the capability that the cluster user equipment can keep calling in the case of critical services, the 3GPP has proposed the requirement for the pattern of IOPS (Isolated E-UTRAN Operation for Public Safety). The pattern of IOPS refers to (N)eNB, i.e., (nomadic) evolved Node B, (or a group of (N)eNBs) can provide a certain level of communication capability for the cluster user in the case where the circuit is interrupted or the circuit fails to lead that the signaling and data cannot be transmitted normally.

Since the IOPS scenario includes one or several connected (N)eNBs and there is no Backhaul Link or a bandwidth-limited backhaul link in the IOPS scenario, it means that the coverage range of IOPS is very limited, and once the user leaves its coverage area, communication interruption must be cased, especially when the user is the group call sponsor or dispatch station, the entire group of communications will be interrupted, which cannot be tolerated by the cluster communication. To avoid this situation, an early warning mechanism is required to be taken to make the user return to the effective communication area to ensure that the communication of the user will not be interrupted.

SUMMARY

Embodiments of the invention provide a terminal device and early warning method for the terminal device to solve the problem that the communication of the terminal device may be interrupted during the moving process in the existing art.

An embodiment of the present disclosure discloses an early warning method for a terminal device, including:

a terminal starts global positioning system, GPS, positioning to acquire current geographical location information in real time, and matches the current geographical location information with geographical location information of a set region in a service area of a base station to which the terminal belongs;

if a matching result is that the terminal has left the set region in the service area of the base station to which the terminal belongs, the terminal performs an early warning operation.

In an exemplary embodiment, in the above-mentioned method, the set region in the service area of the base station to which the terminal belongs includes a safety area in the service area of the base station to which the terminal belongs.

In an exemplary embodiment, after the terminal performs the early warning operation, the method further includes:

when the terminal has receives an instruction, issued by a user, of leaving the set region in the service area of the base station to which the terminal belongs, the terminal stops the warning operation and sends a leaving request to the base station.

In an exemplary embodiment, after the terminal performs the early warning operation, the method further includes:

when the terminal has receives an instruction, issued by a user, of returning to the set region in the service area of the base station to which the terminal belongs, the terminal acquires the current geographical location information of the terminal in real time, and matches with the set region in the service area of the base station to which the terminal belongs, till a matching result is that the terminal returns to the set region in the service area of the base station to which the terminal belongs returned by the terminal, and then stops the early warning operation.

In an exemplary embodiment, in the above-mentioned method, the early warning operation includes a vibration manner and/or voice warning manner.

In an exemplary embodiment, before the terminal matches the current geographical location information with the geographical location information of the set region in the service area of the base station to which the terminal belongs, the method further includes:

after a radio resource control, RRC, connection is completed, the terminal receiving a PriorMessage sent separately by the base station, and acquires the geographical location information of the set region in the service area of the base station to which the terminal belongs from the PriorMessage; or the terminal receives the PriorMessage broadcast by the base station, and acquires the geographical location information of the set region in the service area of the base station to which the terminal belongs from the PriorMessage; or the terminal receives a PriorMessage identification information table, and the terminal searches for the corresponding PriorMessage from the PriorMessage identification information table according to a global base station identification, and acquires the geographical location information of the set region in the service area of the base station to which the terminal belongs from the searched PriorMessage.

An embodiment of the present disclosure discloses a terminal device, including:

a matching unit, configured to match current geographical location information acquired in real time by global positioning system, GPS, positioning, with geographical location information of a set region in a service area of a base station to which the terminal belongs; and an early warning processing unit, configured to perform an early warning operation when a matching result of the matching unit is that the terminal has left the set region in the service area of the base station to which the terminal belongs.

In an exemplary embodiment, in the above-mentioned device, the set region in the service area of the base station to which the terminal belongs includes a safety area in the service area of the base station to which the terminal belongs.

In an exemplary embodiment, the above-mentioned device further includes: a transceiving unit, configured to, after the early warning processing unit performs the early warning operation, if receiving an instruction, issued by a user, of leaving the set region in the service area of the base station to which the terminal belongs, stop the early warning operation and send a leaving request to the base station.

In an exemplary embodiment, the above-mentioned device further includes: a transceiving unit, configured to, after the early warning processing unit performs the early warning operation, if receiving an instruction, issued by a user, of returning to the set region in the service area of the base station to which the terminal belongs, acquire the current geographical location information of the terminal in real time and trigger the matching unit to match the current geographical location information of the terminal acquired in real time with the geographical location information of the set region in the service area of the base station to which the terminal belongs, till a matching result is that the terminal returns to the set region in the service area of the base station to which the terminal belongs, and then stop the early warning operation.

In an exemplary embodiment, in the above-mentioned device, the early warning operation includes vibration and/or voice warning.

In an exemplary embodiment, the above-mentioned device further includes: an acquiring unit, configured to:

after a radio resource control, RRC, connection of the terminal is completed, receive the PriorMessage sent separately by the base station, and acquire the geographical location information of the set region in the service area of the base station to which the terminal belongs from the PriorMessage; or receive the PriorMessage broadcast by the base station, and acquire the geographical location information of the set region in the service area of the base station to which the terminal belongs from the PriorMessage; or receive a PriorMessage identification information table, and search for the corresponding PriorMessage from the PriorMessage identification information table according to a global base station identification, and acquire the geographical location information of the set region in the service area of the base station to which the terminal belongs from the searched PriorMessage.

The embodiment of the present disclosure further provides a computer-readable medium storing program instructions. When program instructions are executed, the above-mentioned method can be implemented.

The technical scheme in the embodiments of the present application determines whether to trigger an early warning signal according to the geographical location of the terminal and the set region of the service area, thereby making the terminal return to the set region to avoid the occurrence of influencing the call quality, such as a dropped call and the like.

BRIEF DESCRIPTION OF DRAWINGS

FIG. 1 is a schematic diagram of an IOPS architecture consisting of a single (N)eNB in the existing art.

FIG. 2 is a flowchart of early warning for a terminal according to an embodiment one of the present disclosure.

DETAILED DESCRIPTION

Figure 3:
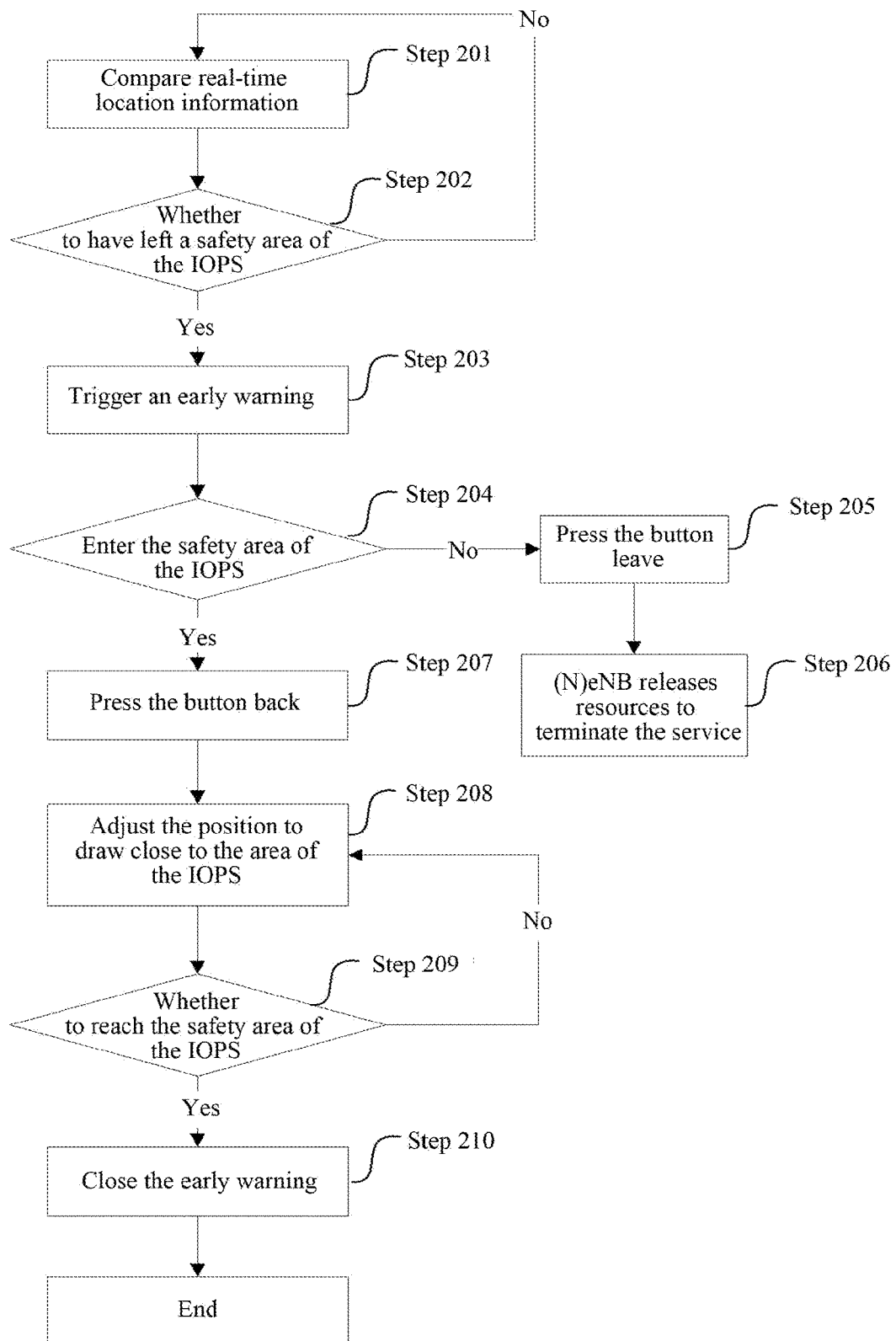
FIG. 3 is a flowchart of early warning for a terminal according to an embodiment of the present disclosure.

It should be noted that, in the case of no conflict, embodiments and features in the embodiments of the present application may be arbitrarily combined with each other.

Embodiment One

When the network side (core network) has a failure (such as the destruction of system facilities caused by earthquakes, fire, etc.), IOPS makes a requirement that users still can communicate, which requires a wireless broadband access system with higher capabilities of fault tolerance and redundant backup, but also requires the user terminal has a stronger function to give support. For example, when a disaster situation occurs, the core network device is destroyed, and IOPS, which is consisted by a single (N)eNB, provides local services to maintain communications of a specific group. As shown in FIG. 1, (N)eNB serves three users, user A, user B, and user C, which belong to the same group. In this scenario, the document proposes that (N)eNB may acquire location PriorMessage of the covered area according to the previous measurement information (the levels may be divided for the location information, such as the set region is within how many kilometers radius is by using (N)eNB as the center), and sending the PriorMessage to the users by multiple manners. For example, the PriorMessage can be sent by the cell broadcast or establishing RRC connection. When the user is leaving the set region (for example, the area where the user can get better service of (N)eNB), the terminal can acquire the location information according to the GPS positioning, and compare it with the PriorMessage. And the terminal determines whether to trigger sending of the early warning signal and makes the user to return to the set region to avoid the occurrence of dropping the call which influences the call quality.

Based on the abovementioned, the present embodiment provides an early warning method for a terminal device. As shown in FIG. 2, the method includes the following operations.

In step 1, a terminal starts GPS positioning to acquire current geographical location information in real time, and matches the current geographical location information with geographical location information of a set region in a service area of a base station to which the terminal belongs.

In step 2, if a matching result is that the terminal has left the set region of the base station to which the terminal belongs, the terminal performs an early warning operation.

Herein, the early warning operation includes a vibration manner and/or voice warning manner.

The set region in the service area of the base station to which the terminal belongs includes a safety area in the service area of the base station to which the terminal belongs (that is, the area which can provide the good signal quality for the users).

In an exemplary embodiment, after the terminal performs the early warning operation, if the terminal receives an instruction, issued by a user, of leaving the set region in the service area of the base station to which the terminal belongs, then the terminal stops the warning operation and sends a leaving request to the (N)eNB, to instruct (N)eNB to release resources.

The (N)eNB described herein includes: eNB (evolved Node B) and NeNB (Nomadic eNB). The base station described herein may be an evolved base station or a non-evolved base station, and may be a nomadic base station or a non-nomadic base station.

If the terminal receives an instruction, issued by a user, of returning to the set region in the service area of the base station to which the terminal belongs, then the terminal may acquire the current geographical location information of the terminal in real time and match with the geographical position information of the set region in the service area of the base station to which the terminal belongs, till a matching result is that the terminal returns to the set region in the service area of the base station to which the terminal belongs, and then stops the early warning operation.

Taking the IOPS scenario as an example, assumed that the set area in the service area of the base station to which the terminal belongs is a safety area of the IOPS, the detailed operation process of the above scheme is shown in FIG. 3, which includes the following steps 201-210.

In step 201, the real-time location information is compared.

In step 202, the terminal determines whether the terminal has left the IOPS safety area; if the terminal finds that the terminal itself has left the safety area (i.e., an area that can provide a good signal quality for the user) of the IOPS according to the real-time location information, the step 203 will be executed.

In step 203, the vibration or voice warning: 'You are about to leave the safety area' of the terminal is triggered (i.e., an early warning operation is triggered).

In step 204, the user determines whether to adjust the position to draw close to the (N)eNB according to the service requirement, that is, determines whether to enter the IOPS safety area; if no, step 205 will be executed, and if yes, step 207 will be executed.

In step 205, if it is determined to leave the IOPS safety area, then a keystroke "Leave" is pressed (i.e., the user issues an instruction of leaving the safety area of the IOPS), and the early warning is closed and the departing request is sent to the (N)eNB.

In step 206, (N)eNB releases its resource to terminate the service.

In step 207, if the user is aware of needing to return to the safety area of the IOPS, a keystroke "back" is pressed (i.e., the user issues an instruction of returning to the safety area of the IOPS)

In step 208, the position is adjusted to draw close to the (N)eNB according to the GPS, to return to the safety area of the IOPS.

In step 209, it is determined whether to return to the safety area of the IOPS; if yes, step 210 is executed, and if no, step 208 is returned to continue to adjust.

In step 210, it is determined that closing of the early warning is triggered according to the position, and the step ends.

Figure 4:
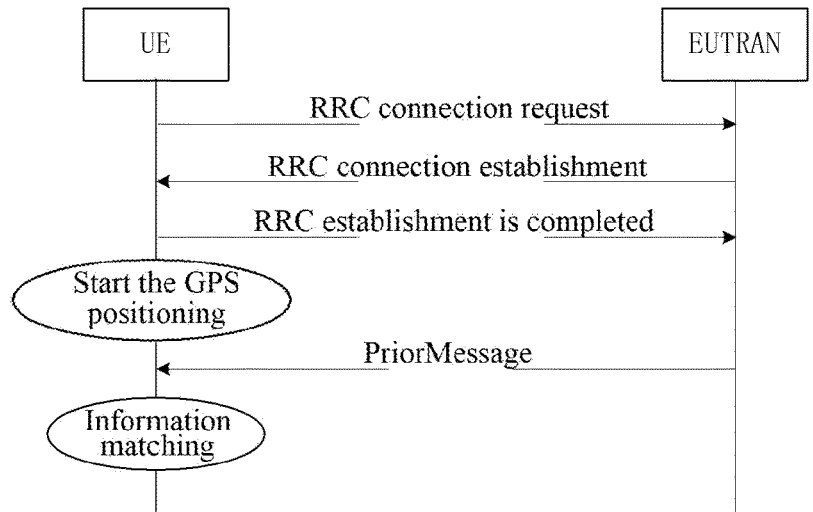
FIG. 4 is a flowchart of a terminal acquiring geographical information of a set region in the service area of the base station to which the terminal belongs in one way according to an embodiment of the present disclosure.

In addition, before the terminal matches the current geographical location information with the geographical location information of the set region in the service area of the base station to which the terminal belongs, the terminal needs to acquire the geographical location information of the set region in the service area of the base station to which the terminal belongs, and there are a diverse of acquiring manners, which are not limited in the present embodiment The IOPS scenario is still taken to be an example below, and assumed that the set area in the service area of the base station to which the terminal belongs is a safety area of IOPS. FIG. 4 shows that the terminal acquires the geographical location information in the safety area of the IOPS through the PriorMessage sent separately by the (N)eNB. Herein, after the RRC connection is completed, the user A starts the GPS positioning. The (N)eNB may inform the user A of the geographical information in the safety area of IOPS through the PriorMessage. In this way, the user A compares the geographical information carried in the PriorMessage (that is, the geographical location information in the safety area of the IOPS) with the location information provided by the GPS in real time.

Figure 5:
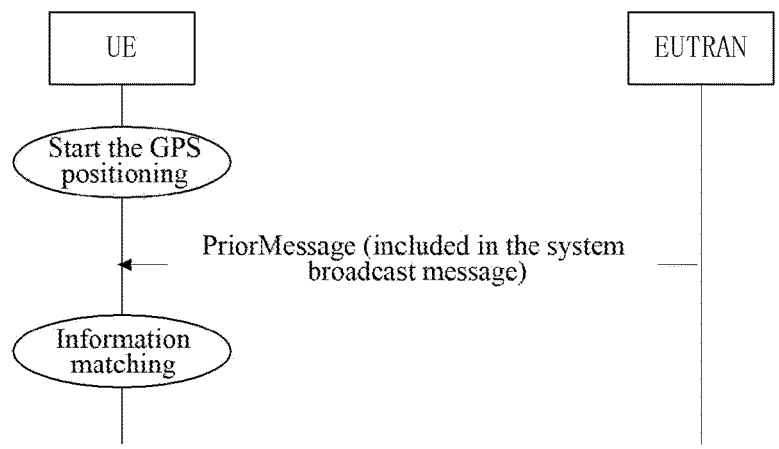
FIG. 5 is a flowchart of a terminal acquiring geographical information of a set region in the service area of the base station to which the terminal belongs in another way according to an embodiment of the present disclosure.

FIG. 5 shows that the terminal acquires geographical location information in the safety area of the IOPS through a PriorMessage sent by the broadcast of the (N)eNB. Herein, the (N)eNB sends the PriorMessage through the system broadcast to inform all users of the covered area of their prior location information and start GPS positioning to acquire their geographical information in real time. After the terminal receives the geographical information carried by the PriorMessage (that is, the geographical location information in the safety area of the IOPS), the terminal compares it with the location information provided by the GPS in real time.

Figure 6:
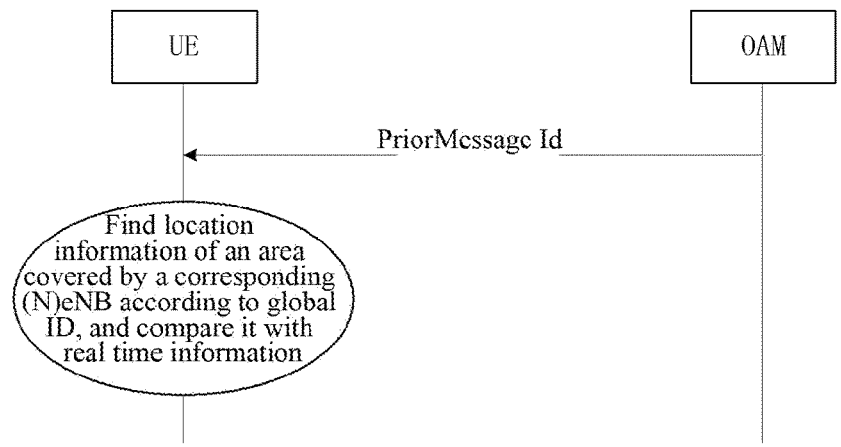
FIG. 6 is a flowchart of a terminal acquiring geographical information of a set region in the service area of the base station to which the terminal belongs in further another way according to an embodiment of the present disclosure.

FIG. 6 shows that the terminal acquires the geographical location information in the safety area of the IOPS through a PriorMessage identification (Id) information table. For example, before the circuit is interrupted, the OAM informs all users of the covered area of the PriorMessageId information table, and the PriorMessageId information table includes two parts: the global (N)eNB ID (global base station identification) and PriorMessage about covering of the base station, herein, each global (N)eNB ID corresponds to one piece of PriorMessage Id information. The user terminal in the connected state starts the GPS positioning to acquire its geographical information in real time. After the user finds the geographical location information carried in the corresponding PriorMessageId (that is, the geographical location information in the safety area of the IOPS) according to global (N)eNB ID, it is compared with the location information provided by the GPS in real time.

Embodiment Two

Figure 7:
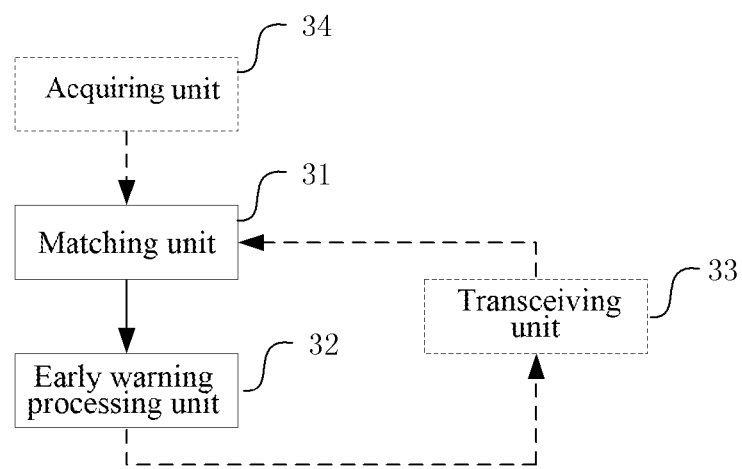
FIG. 7 is a structural schematic diagram of a terminal device according to an embodiment two of the present disclosure.

The present embodiment provides a terminal device, and as shown in FIG. 7, the terminal device at least includes: a matching unit 31 and an early warning unit 32.

The matching unit 31 is configured to match current geographical location information acquired in real time by GPS positioning with geographical location information of a set region in a service area of a base station to which a terminal belongs.

Herein, the set region in the service area of the base station to which the terminal belongs includes a safety area in the service area of the base station to which the terminal belongs.

The early warning processing unit 32 is configured to perform an early warning operation when a matching result of the matching unit is that the terminal has left the set region of the base station to which the terminal belongs.

Herein, the early warning operation includes a vibration manner and/or voice warning manner.

In addition, the above-mentioned device may further includes: a transceiving unit 33 configured to, after the early warning processing unit 32 performs the early warning operation, if receiving an instruction, issued by a user, of leaving the set region in the service area of the base station to which the terminal belongs, stop the warning operation and send a leaving request to the base station.

In an exemplary embodiment, the transceiving unit 33 may further be configured to, after the early warning processing unit 32 performs the early warning operation, if receiving an instruction, issued by a user, of returning to the set region in the service area of the base station to which the terminal belongs, acquire the current geographical location information of the terminal in real time and trigger the matching unit 31 to match the current geographical location information of the terminal acquired in real time with the geographical location information of the set region in the service area of the base station to which the terminal belongs, till a matching result is that the terminal returns to the set region in the service area of the base station to which the terminal belongs, and then stop the early warning operation.

In an exemplary embodiment, the above-mentioned device may further include: an acquiring unit 34, configured to:

after RRC connection of the terminal is completed, receive the a PriorMessage sent separately by the base station, and acquire the geographical location information of the set region in the service area of the base station to which the terminal belongs from the PriorMessage; or receive the PriorMessage broadcast by the base station, and acquire the geographical location information of the set region in the service area of the base station to which the terminal belongs from the PriorMessage; or receive a PriorMessage identification information table, and search for the corresponding PriorMessage from the PriorMessage identification information table according to a global base station identification, and acquire the geographical location information of the set region in the service area of the base station to which the terminal belongs from the searched PriorMessage.

As the above-mentioned device can realize the method of the above-mentioned embodiment one, thus other detailed description of the device can refer to the corresponding contents in the above-mentioned embodiment one, which will not be repeated here.

Those ordinarily skilled in the art can understand that all or some of steps of the abovementioned method may be completed by the programs instructing the relevant hardware, and the programs may be stored in a computer-readable storage medium, such as read only memory, magnetic or optical disk or the like. In an exemplary embodiment, all or some of the steps of the abovementioned embodiments may also be implemented by using one or more integrated circuits. Accordingly, various modules/units in the abovementioned embodiments may be realized in a form of hardware, or in a form of software function modules. The present application is not limited to any specific form of hardware and software combinations.

INDUSTRIAL APPLICABILITY

The technical scheme in the embodiments of the present application determines whether to trigger an early warning signal according to the geographical location of the terminal and the set region of the service area, thereby making the terminal return to the set region to avoid the occurrence of influencing the call quality, such as a dropped call and the like.

What is claimed is:

1. An early warning method for a terminal device, comprising:
    starting, by a terminal, global positioning system (GPS) positioning to acquire current geographical location information in real time, and matching the current geographical location information with geographical location information of a set region in a service area of a base station to which the terminal belongs; and
    when a matching result is that the terminal has left the set region in the service area of the base station to which the terminal belongs, the terminal performing an early warning operation; wherein, the set region in the service area of the base station to which the terminal belongs comprises a safety area in the service area of the base station to which the terminal belongs;
    wherein, after the terminal performs the early warning operation, the method further comprises:
    when the terminal receives an instruction, issued by a user, of leaving the set region in the service area of the base station to which the terminal belongs, stopping, by the terminal, the warning operation and sending a leaving request to the base station;
    wherein, before the terminal matches the current geographical location information with the geographical location information of the set region in the service area of the base station to which the terminal belongs, the method further comprises:
    after a radio resource control (RRC) connection is completed, receiving, by the terminal, a PriorMessage sent separately by the base station, and acquiring the geographical location information of the set region in the service area of the base station to which the terminal belongs from the PriorMessage; or
    receiving, by the terminal, the PriorMessage broadcast by the base station, and acquiring the geographical location information of the set region in the service area of the base station to which the terminal belongs from the PriorMessage; or
    receiving, by the terminal, a PriorMessage identification information table, and the terminal searching for the corresponding PriorMessage from the PriorMessage identification information table according to a global base station identification, and acquiring the geographical location information of the set region in the service area of the base station to which the terminal belongs from the searched PriorMessage.

2. The method of claim 1, wherein, after the terminal performs the early warning operation, the method further comprises:

when the terminal receives an instruction, issued by the user, of returning to the set region in the service area of the base station to which the terminal belongs, acquiring, by the terminal, the current geographical location information of the terminal in real time, and matching with the set region in the service area of the base station to which the terminal belongs, till a matching result is that the terminal returns to the set region in the service area of the base station to which the terminal belongs, and then stopping, by the terminal, the early warning operation.

3. The method of claim 1, wherein, the early warning operation comprises at least one of a vibration and a voice warning.

4. A terminal device, comprising:
a matching unit, configured to match current geographical location information acquired in real time by global positioning system (GPS) positioning, with geographical location information of a set region in a service area of a base station to which the terminal belongs; and
an early warning processing unit, configured to perform an early warning operation when a matching result of the matching unit is that the terminal has left the set region in the service area of the base station to which the terminal belongs; wherein, the set region in the service area of the base station to which the terminal belongs comprises a safety area in the service area of the base station to which the terminal belongs; the device further comprising
a transceiving unit, configured to, after the early warning processing unit performs the early warning operation, if receiving an instruction, issued by a user, of leaving the set region in the service area of the base station to which the terminal belongs, stop the early warning operation and send a leaving request to the base station; the device further comprising: an acquiring unit configured to:
after a radio resource control (RRC) connection of the terminal is completed, receive a PriorMessage sent separately by the base station, and acquire the geographical location information of the set region in the service area of the base station to which the terminal belongs from the PriorMessage; or
receive the PriorMessage broadcast by the base station, and acquire the geographical location information of the set region in the service area of the base station to which the terminal belongs from the PriorMessage; or
receive a PriorMessage identification information table, and search for a corresponding PriorMessage from the PriorMessage identification information table according to a global base station identification, and acquire the geographical location information of the set region in the service area of the base station to which the terminal belongs from the searched PriorMessage.

5. The device of claim 4, wherein
the transceiving unit, is further configured to, after the early warning processing unit performs the early warning operation, if receiving an instruction, issued by a user, of returning to the set region in the service area of the base station to which the terminal belongs, acquire the current geographical location information of the terminal in real time and trigger the matching unit to match the current geographical location information of the terminal acquired in real time with the geographical location information of the set region in the service area of the base station to which the terminal belongs, till a matching result is that the terminal returns to the set region in the service area of the base station to which the terminal belongs, and then stop the early warning operation.

6. The device of claim 4, wherein, the early warning operation comprises at least one of vibration and/or voice warning.

7. A non-transitory computer-readable medium where program instructions are stored, wherein, when the program instructions are executed, the method of claim 1 can be implemented.

8. The method of claim 2, wherein, the early warning operation comprises at least one of a vibration and a voice warning.

* * * * *